US006177123B1

(12) United States Patent
Stute et al.

(10) Patent No.: US 6,177,123 B1
(45) Date of Patent: *Jan. 23, 2001

(54) PROCESS FOR THE PRODUCTION OF A WINE POWDER

(75) Inventors: Rolf Stute, Remseck; R. Klingler, Berlin, both of (DE)

(73) Assignee: Bestfoods, Englewood Cliffs, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/893,898

(22) Filed: Jul. 11, 1997

(30) Foreign Application Priority Data

Jul. 22, 1996 (DE) .............................. 196 29 527

(51) Int. Cl.⁷ ....................................... A23L 1/22
(52) U.S. Cl. .................. 426/650; 426/589; 426/592; 426/661
(58) Field of Search ..................... 426/650, 658, 426/661, 589, 590, 592

(56) References Cited

U.S. PATENT DOCUMENTS

| 3,786,159 | 1/1974 | Sato et al. | 426/302 |
|---|---|---|---|
| 4,454,165 | 6/1984 | Sato et al. | 426/592 |

FOREIGN PATENT DOCUMENTS

| 25 23 585 | 12/1976 | (DE) . |
|---|---|---|
| 1324917 | 7/1973 | (GB) . |
| 1 426 106 | 2/1976 | (GB) . |

OTHER PUBLICATIONS

Hartmeier, W., 77(09):H1524 FSTA, Abstracting German Federal Republic Patent Application, 2507507, 1976.*
Abstract of Japanese Patent No. 72 03 93 55, 1995.
Abstract of Japanese Patent Application No. 57 09 11 87, 1995.
Abstract of Japanese Patent Application No. 57 08 62 83, 1995.
Abstract of Japanese Patent Application No. 57 13 28 76, 1995.
Abstract of Japanese Patent Application No. 57 12 27 88, 1995.
Barthelomal, G.B., et al., "Influence of Cellulose and Starch on the Retention of Volatiles During Freeze–Drying of a Liquid Extract of Mushroom", Lebensmittel Wissenschaft und Technik, 8: 174–176 (1975).
Studies on Mechanisms of Retention of Volatile in Freeze–Dried Food Models: The System PVP–n–Propanol, J. Food Science 38:. 671–674 (1973).

* cited by examiner

*Primary Examiner*—Leslie Wong
(74) *Attorney, Agent, or Firm*—Norris, McLaughlin & Marcus

(57) ABSTRACT

An aroma powder based on an alcohol-containing liquid, in particular a wine powder, which, when used in foods, in particular soups, sauces and desserts, gives rise to the same flavor impression as the addition of the underlying alcohol-containing liquid. The aroma powder displays little taste of its own, is readily free-flowing and meterable, particularly in the dry form, and is non-hygroscopic or only slightly hygroscopic. The aroma powder contains aroma-active constituents of an alcohol-containing liquid and, as a carrier for the aroma-active constituents, a high-amylose starch product, in particular pea starch and pea amylose.

4 Claims, No Drawings

PROCESS FOR THE PRODUCTION OF A WINE POWDER

FIELD OF THE INVENTION

The present invention has to do with aroma powders for use in foods and processes for production of the aroma powders. More specifically, the present invention relates to an aroma powder based on an alcohol-containing liquid, which, when used in foods, gives rise to the same flavor impression as the addition of the underlying alcohol-containing liquid.

BACKGROUND OF THE INVENTION

Alcohol-containing liquids such as spirits and, in particular, wine are traditionally used in cuisine for enriching or producing special foods. Known examples include Burgundy sauce, Riesling sauce or Madeira sauce. Just as in soups and sauces, alcoholic beverages are also used with desserts (e.g. in zabaione or tiramisu).

Both the alcohol and, particularly, the aroma-active constituents of the alcoholic beverages are relatively volatile, and wine and spirits are therefore generally not added to the foods until the end of the preparation. Nevertheless, even in these traditional applications, sometimes quite considerable aroma and flavor losses are unavoidable.

In particular, in the production of dry products, the volatility of the aroma-active constituents represents a great difficulty.

Using wine as an example, these difficulties may be readily demonstrated.

In the case of wine, flavor and aroma are composed in principle of three basic elements. The three elements are: a characteristic bouquet of predominantly highly volatile aroma substances, a likewise characteristic basic taste due to non-volatile constituents and characterized, inter alia, by sugar and organic acids, and finally the alcohol content. The composition of these basic elements determines the type, while their balance determines the quality, of the wine in question. Accordingly, in principle, in a wine powder, these three basic elements should be present not only in a sufficiently high concentration typical of the wine in question, but they should also be present in a balanced ratio which goes to make up high quality.

Retaining the volatile aroma substances during drying is difficult enough, but it is particularly difficult in the presence of a highly volatile constituent, in this case alcohol, which is present in a great excess. This is a considerable reason why wine powders of satisfactory quality have been virtually unavailable to date.

There have been a number of attempts to produce aroma powders from alcohol-containing liquids. Thus, the publications "Alcoholic Powders—Characteristics and Applications", *Food Product Development*, 11:18 (1977), German Patent Application No. 32 14 321 corresponding to Sato, et al. U.S. Pat. No. 4,454,165 entitled "Preparation of Alcohol Containing Powders"; Derwent Abstract of Japanese Patent No. 72 03 93 55; Derwent Abstracts of Japanese Patent Application Nos. 57 09 11 87, 57 08 62 83, 57 13 28 76, 57 12 27 88 and 49 64460; and Sato, et al. U.S. Pat. No. 3,786,159 disclose various carriers which have differing effects on individual aroma compounds. However, in these publications, aroma powders are generally proposed which are said to have a particularly high alcohol content. U.S. Pat. No. 4,454,165 proposes as carrier a hydrolyzed starch (maltodextrin), which is dried together with a 1:0.75 mixture of red wine and a 95% strength alcohol. The products described there are suitable, because of the high alcohol content, as beverage powders, preservatives and additives for pharmaceutical products and cosmetic products.

These alcohol-rich powders are less suitable as aroma powders for soups and sauces or desserts, since they have only slight aroma stability and sometimes have a high hygroscopicity. Therefore, they require air-tight packages. In the case of aroma substances for soups, sauces and desserts, it is not necessarily the alcohol content of the aroma powder which is important, the majority of which evaporates during cooking in any case, but, rather, a balanced and characteristic taste and aroma profile.

Economic production, for example, of a wine powder, is also only possible if the alcohol can be recovered as completely as possible. Therefore, the production of an aroma-intensive wine powder includes a very highly selective separation of alcohol and aroma substances. This means, as far as the carrier is concerned: a retention capacity as high as possible for the aroma substances and a low retention capacity for the alcohol.

Although polymeric carbohydrates such as starches and dextrins have been studied in the prior art for their suitability as carriers for aroma powders, such as in Barthelomal, G. B., et al., "Influence of Cellulose and Starch on the Retention of Volatiles During Freeze-Drying of a Liquid Extract of Mushroom", *Lebensmittel Wissenschaft und Technik*, 8: 174–176 (1975) and "Studies on Mechanisms of Retention of Volatile in Freeze-Dried Food Models: The System PVP-n-Propanol", *J. Food Science* 38: 671–674 (1973), they have been considered to date as not very suitable for the production of dry aromas. Starch hydrolysates (maltodextrins of different degrees of hydrolysis) have also been previously proposed as carriers for aroma powders, but in this case also only for powders having high alcohol contents, as in DE-A 32 14 321.

In the case of the aroma powders produced in the prior art, it is frequently necessary to add additional aromas afterwards. Also, some processes for the production of aroma powders from alcohol-containing liquids require the use of liquids having a decreased alcohol content. Both these features are unfavorable from the economic aspect and do not give a product having outstanding flavor properties.

More recent highly effective processes for aroma encapsulation (for cold extrusion) are suitable, for example, for the encapsulation of essential oils, but not for the production of wine powders because of the high water and alcohol contents.

An object of the invention is, therefore, to provide an aroma powder, in particular a wine powder, which, when used in foods such as, in particular, soups, sauces and desserts, gives rise to the same flavor impression as the addition of the underlying alcohol-containing liquid.

Another object of the present invention is to provide an aroma powder having as little as possible taste of its own.

Another object of the present invention is to provide an aroma powder that is readily free-flowing and meterable, particularly in the dry form, and is non-hygroscopic, or only slightly hygroscopic.

SUMMARY OF THE INVENTION

The objects of the present invention are achieved based on the surprising finding that amylose and, in particular, high-amylose starches, such as pea starch and modified high-amylose starches, in contrast to conventional modified or non-modified starches, have an outstanding retention capacity for aroma substances and a very low retention capacity for alcohol. When the carriers of the invention are used, it is not necessary to add aroma substances to the aroma powder.

The invention therefore provides an aroma powder based on an alcohol-containing liquid, a process for its production and a use for this aroma powder.

DETAILED DESCRIPTION OF THE INVENTION

The aroma powder of the invention contains a carrier and aroma-active constituents of an alcohol-containing liquid, the carrier being a high-amylose starch product. The aroma powder is preferably a wine powder. However, aroma powders based on whisky, calvados, cider, etc. are also provided according to the invention.

The high amylose-starch preferably has at least about 30% by weight amylose, more preferably 34% by weight amylose. The high-amylose starch can be used as such, and can alternatively be subjected to a slight acid degradation (modification) to decrease the viscosity. The degree of modification is not essential according to the invention and can be set separately for each individual case. However, it is preferred that the degradation by acid hydrolysis be carried out to an extent such that the viscosity is decreased to at least ⅓ of the original viscosity. Further or complete degradation to monomers or oligomers, as is the case in the production of maltodextrins, where the amylose character is lost, must not occur, however.

The use of chemically modified high-amylose starch is also possible. The possibilities of chemically modifying starches for use in aroma powders are known in the prior art.

Starch products having a subsequently increased amylose content are also usable, for example, pure or modified amylose. Preference is given according to the invention to pea starch or pea amylose.

The alcohol content of the aroma powder of the invention is less than the alcohol content of the underlying alcohol-containing liquid and, in the case of a wine powder, is preferably less than 10%, more preferably less than 5%, and in particular less than 1%.

The aroma powders of the invention may be used in any foods, but preferably in soups, sauces and desserts. The powders of the invention may generally be used in the same manner as the degelatinized starches frequently used in dry products.

The aroma powders of the invention can be prepared by processes conventional in the prior art. In a first step, a starch paste is produced from starch and the alcohol-containing liquid, which starch paste is then dried in a second step. The drying process is not critical, but should preferably not be carried out at elevated temperature. If the viscosity of the starch paste permits, the drying can be performed, for example, by spray-drying. Preferably, the aroma powders of the invention are not produced by spray-drying but by freeze-drying.

The ratio between the carrier used and the amount of the alcoholic beverage used depends on the specific alcoholic beverage and the specifically selected carrier. Generally, the amount of the carrier is about 2 to about 50% by weight of the alcohol-containing liquid, preferably 5 to 30%, by weight and in particular 10 to 20% by weight.

The amount of aroma powder which is added to the respective foods depends on the respective products and it is not possible to state a general range. Frequently, an addition in the order of magnitude of 1% is suitable.

The following examples illustrate the invention, but are not meant to limit the scope of the invention in any way whatsoever.

EXAMPLE 1

This example shows that markedly improved sensory quality and aroma retention were achieved not only in comparison with other starches but also in comparison with commercial white wine powders.

100 g of pea starch are gelatinized by heating in 900 ml of white wine (Niederkirchner Riesling, Palatinate) and the starch paste thus obtained is freeze-dried after cooling.

Corresponding wine powders were produced from corn and waxy corn starch from the same wine and in the same manner.

Table 1 shows the sensory evaluation of the resulting products (2.5 g of each in 250 ml of a brown sauce) and the contents of ethyl isobutyrate and ethyl butyrate in the wine powder as indicator substances for aroma retention. As a comparison, commercial powders are also used. The commercial powder 1 is a white wine powder from the Sato company, which essentially corresponds to a powder according to the prior art discussed at the outset of the description. It contains 60% sugar as carrier and has an alcohol content of 30%. The white wine powder 2 is the powder FIS IS 21 21, the carrier comprises 91.5% maltodextrin, the alcohol content is 1.3% and the powder has 4% white wine extract.

TABLE 1

| | Sensory evaluation | Ethyl butyrate contents [µg/kg] | |
|---|---|---|---|
| | | iso- | n- |
| Corn starch | very weak, as after extended cooking; | <10 | <10 |
| Waxy corn starch | weak, but somewhat more acidic; | <10 | <10 |
| Pea starch | fruity, typical as of freshly added wine | 215 | 108 |
| Commercial powder I | weak, not very typical | 10 | 24 |
| Commercial powder II | flat, but still having wine character | 84 | 103 |

EXAMPLE 2

Red Wine powders were produced from corn, waxy corn and pea starch in the same manner as in Example 1. Again, two commercial red wine powders were used for comparison. In this case, the initial wine was also analyzed and the alcohol content was determined for the starch powders. As regards the commercial red wine powders, the commercial powder 1 is the product Molda IS 1422, which contains glucose syrup, DE 30–33 as carrier, and dealcoholized French red wine. The commercial powder 2 is the product Robertet IS 26 907, which has 80% maltodextrin as carrier, DM>94%.

TABLE 2

|  | Sensory evaluation | Ethyl butyrate contents [μg/kg] | | Alcohol content [%] |
|---|---|---|---|---|
|  |  | iso- | n- |  |
| Corn starch | markedly weaker than pea starch | 33 | 97 | 0.18 |
| Waxy corn starch | markedly weaker than pea starch | 36 | 37 | 0.38 |
| Pea starch | almost like the initial wine | 100 | 155 | 0.36 |
| Commercial powder I | flat, scarcely like wine | <10 | <10 | n.d. |
| Commercial powder II | weak, atypical raspberry-like | 75 | 55 | n.d. |
| Initial wine | typical | 64 | 68 | 10.5 |

Once again, the table shows not only the improved aroma retention of the pea starch in comparison with the other starches (as also in comparison with the commercial products), but also the relatively low retention capacity for ethanol, so that the alcohol can be virtually completely recovered. Based on the initial values, the retention capacity for the esters is 17% and 25%, and for the alcohol present at 90 million-fold excess, only 0.4%.

EXAMPLE 3

Acid-degraded pea starch is used as aroma-binding carrier. The pea starch is modified by impregnating 100 g of starch with 4 mmol of HCl, then beating to 68° C., subsequently neutralizing with a soda solution equimolar to the HCl concentration and simultaneously cooling.

100 g of the acid-modified pea starch are gelatinized by heating in 400 ml of red wine (Beaujolais) and the starch paste thus obtained is freeze-dried after cooling.

A corresponding wine powder was produced from native pea starch from the same wine and in the same manner.

TABLE 3

| STARCH TYPE | ETHYL BUTYRATE CONTENT [μg/kg] | | ALCOHOL CONTENT (%) |
|---|---|---|---|
|  | iso- | n- |  |
| NATIVE PEA STARCH | 100 | 155 | 3.6 |
| ACID-MODIFIED PEA STARCH | 134 | 590 | 1.9 |

Table 3 shows that the improved aroma retention of the pea starch, in comparison with the corn starch and waxy corn starch and the commercial products (cf. Table 2), can be further increased by an acid modification and the alcohol content can be decreased.

The invention now being fully described, it will be apparent to one of ordinary skill in the art that many changes and modifications can be made thereto without departing from the spirit or scope of the invention as set forth herein.

What is claimed is:

1. A process for the production of a wine powder consisting essentially of aroma-active constituents of wine, less than about 10% of the alcohol content of said wine and a carrier having a high capacity for retention of said aroma-active constituents and low retention capacity for alcohol which carrier is selected from the group consisting essentially of native pea starch and acid-modified pea starch, wherein a starch paste is produced from starch and the wine, the amount of starch being about 2% by weight to about 50% by weight of the wine, and dried to form said aroma powder.

2. The process of claim 1, wherein said starch paste is freeze-dried.

3. The process of claim 1 wherein the amount of said starch is about 5% by weight to about 30% by weight of said wine.

4. The process of claim 1 wherein the amount of said starch is about 10% by weight to about 20% by weight of said wine.

* * * * *